United States Patent [19]

Henke

[11] Patent Number: 5,012,071
[45] Date of Patent: Apr. 30, 1991

[54] GREASE SPLATTER CAPTURE SHIELD

[75] Inventor: Mitchell C. Henke, Fort Wayne, Ind.

[73] Assignee: Lincoln Foodservice Products, Inc., Fort Wayne, Ind.

[21] Appl. No.: 436,383

[22] Filed: Nov. 14, 1989

[51] Int. Cl.$^5$ .................. F27D 7/04; F24C 15/12; A47J 36/38
[52] U.S. Cl. .................. 219/400; 220/369; 126/299 C
[58] Field of Search .......... 219/400; 126/299 C, 126/384; 220/369

[56] References Cited

U.S. PATENT DOCUMENTS

| | | | |
|---|---|---|---|
| 534,138 | 2/1895 | Cleary | 220/369 |
| 947,642 | 1/1910 | Leave . | |
| 2,415,613 | 6/1944 | Sulak | 220/ |
| 2,636,636 | 2/1952 | Smith | 220/ |
| 2,643,024 | 6/1953 | Cronheim | 126/299 C |
| 2,702,143 | 2/1955 | Williamson | 220/369 |
| 4,091,956 | 5/1978 | Vecchio | 126/384 |
| 4,091,956 | 5/1978 | Vecchio | 220/231 |
| 4,438,572 | 3/1984 | Kaminski | 34/218 |
| 4,479,776 | 10/1984 | Smith | 219/400 |
| 4,482,077 | 11/1984 | Henderson | 126/384 |
| 4,626,661 | 12/1986 | Henke | 219/400 |
| 4,747,392 | 5/1988 | Rogers | 126/299 C |
| 4,876,437 | 10/1989 | Kondo | 219/400 |

FOREIGN PATENT DOCUMENTS 2702857  7/1978  Fed. Rep. of Germany ...... 220/369

Primary Examiner—Teresa J. Walberg
Attorney, Agent, or Firm—Jeffers, Hoffman & Niewyk

[57]    ABSTRACT

A splatter capture shield for impingement ovens. The shield has a plurality of elements which are vertically overlapping but not physically touching to allow the jetted air streams of the impingement oven into a baking pan, but not to allow escaping gas with entrained grease to pass through the shield without hitting one of the shield elements. The vaporized grease collects on the shield elements and then drips back down on the food item, thus self-basting the food item.

3 Claims, 3 Drawing Sheets

GREASE SPLATTER CAPTURE SHIELD

BACKGROUND

The present invention relates to cooking ovens. More particularly, the field of the present invention is that of grease splatter capture shields for use in impingement and other ovens.

Impingement ovens provide accelerated cooking times in many applications. In the operation of an impingement oven, columnated jets of hot air or steam are directed at food items and transfer heat at a much greater rate than in convection ovens. Impingement oven systems are disclosed in U.S. Pat. Nos. 4,626,661 and 4,438,572, which are explicitly incorporated by reference herein.

One problem with oven cooking involves grease and fat in food items being cooked. For example, chickens have fat which renders out during cooking. As the jets of hot air flow over the chicken in an impingement oven, fat vaporizes and is carried away from the baking pan. Usually something blister pops, or a similar occurs, and the fat spatters into the cooking chamber to be carried by various air flows. The air with vaporized fat then circulates around the oven and deposits the fat, thereby severely soiling the interior of the oven. This problem is exacerbated by a grill rack which compresses the chicken to improve its cooking, because the internal vapor pressure and moisture pressure developed by the grill rack causes additional splatter.

Some attempts to solve this problem involved enveloping the pan, grill, and food product to contain the grease. These attempts fail because they effectively stop the impingement air flow and increase cooking time.

Also, grease extractors are known for ventilator hoods in laboratories, but such extractors rely on high velocities of air movement. For impingement ovens, grease moves at a relatively low velocity as it comes off the food product and forms deposits on the oven interior before being drawn through the air recirculation system.

Another problem with impingement ovens involves the basting of items such as chickens. A significant amount of the chicken's natural moisture is vaporized and carried away in the air flow. Sometimes, the chicken will be aesthetically unpleasing because it has dried out during its cooking in the impingement oven. At other times, the chicken is not dried but may lack the full flavor of a chicken baked and basted in a conventional oven.

One object of the present invention is to provide a splatter capture shield which prevents the escape of fat and grease into the oven interior while still allowing the jets of air to cook the food item.

Another object of the present invention is to provide a splatter capture shield which self-bastes the food item.

SUMMARY OF THE INVENTION

The present invention is a capture shield for impingement ovens which prevents vaporized grease or fat from exiting the baking pan, but allows the hot jets of air to cook the food item. To accomplish this, a plurality of elongate shield elements extend over the pan and block any direct flow of air. The air flow diverts around the shield elements, so suspended fat and grease impact on the sides of the elements, deposit on the sides, and accumulate. Eventually, the deposited fat and grease drip back down onto the food item. Thus, the capture shield of the present invention provides self-basting impingement cooking while greatly preventing grease deposits on the oven itself.

The present invention, in one form, is a splatter capture shield for a baking pan and grill rack in an impingement oven. The capture shield comprises a pair of side walls, a pair of end aprons, and a plurality of elongate shield elements. The end aprons are connected between the side walls, with the end aprons adapted to fit over the grill rack. The shield elements have two ends attached to the side walls and are arranged between end aprons. The shield elements vertically overlap and obstruct a direct line-of-sight from over the shield to the baking pan, and are spaced apart to allow air to pass through substantially all of the capture shield.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
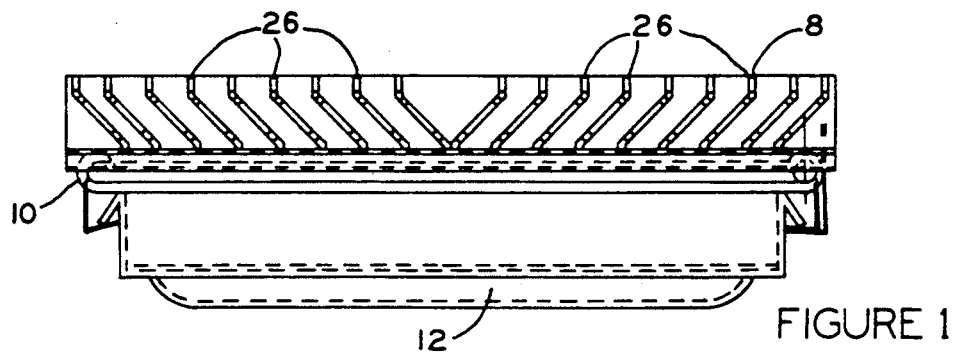
FIG. 1 is a side view of a baking pan and capture shield assembly of the present invention wherein the shield is shown in section.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 2:
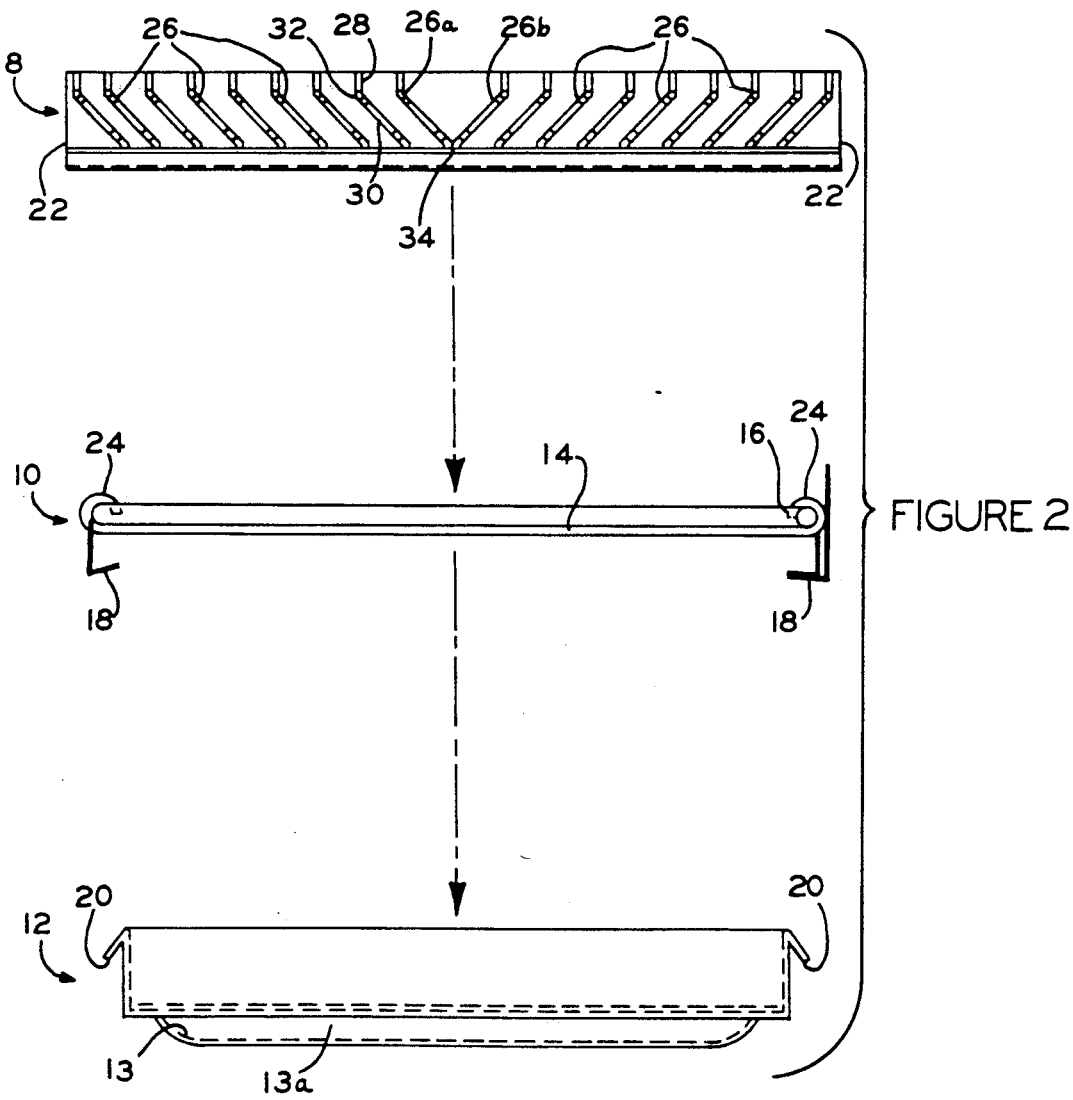
FIG. 2 is an exploded view of FIG. 1.
Figure 3:
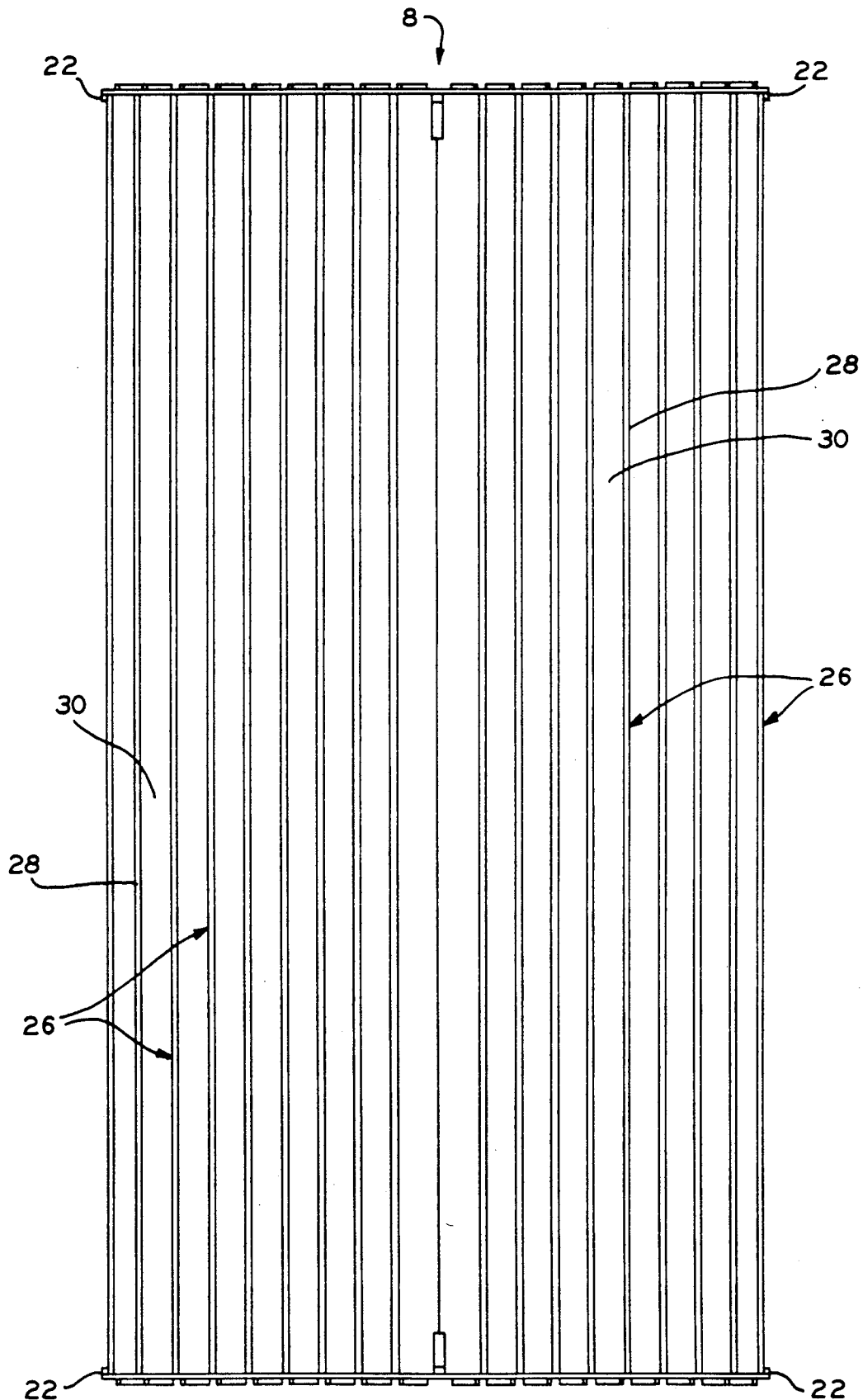
FIG. 3 is a top view of the capture shield of the present invention.

The capture shield of the present invention is designed for use within an impingement oven as well as other ovens. Examples of impingement ovens which are compatible with the present invention are found in the aforementioned U.S. Pat. Nos. 4,626,661 and 4,438,572. Referring to FIGS. 1, 2, and 3, capture shield 8 is located on grill rack 10, both of which are attached over baking pan 12. A food item such as a chicken is placed within baking pan 12 and grill rack 10 is placed on the chicken to compress and flatten it. Baking pan 12 is rectangularly shaped with four side walls and an open top. Preferably, the bottom of baking pan 12 has a grooved surface 13 defining ribs 13a and depressions. Grill rack 10 includes a plurality of transverse rods 14 which pivot about an axial rod 16. Connected to both ends of grill rack 10 are hooks 18 which are adapted to latch over retainer 20 of baking pan 12. End aprons 22 of capture shield 8 are adapted to fit closely over end loops 24 of grill rack 10. Alternately, grill rack 10 can be omitted.

In accordance with the present invention, capture shield 8 is provided with a plurality of elongate fins 26.

Figure 4:
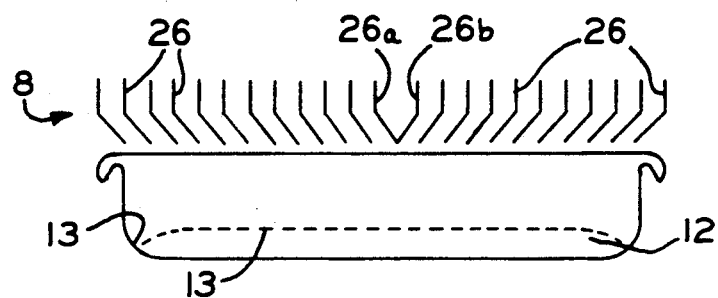
FIG. 4 is a diagrammatic end view of the capture shield.
Figure 5:
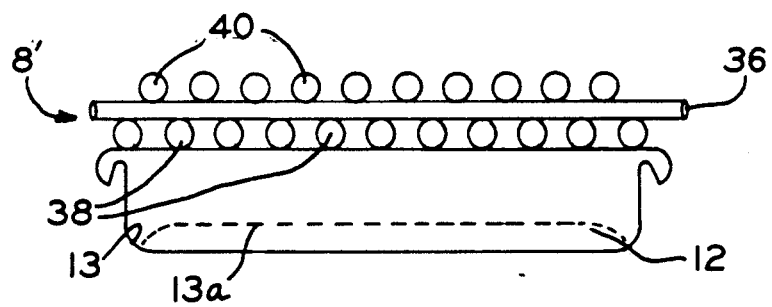
FIG. 5 is a diagrammatic end view of a pan and alternative embodiment of the present invention.
Figure 6:
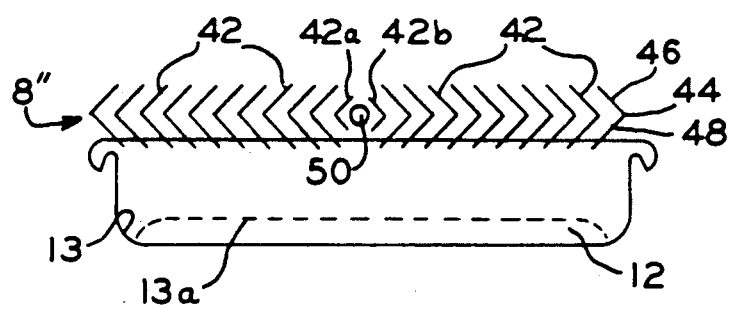
FIG. 6 is a diagrammatic end view of a V-configuration embodiment of the present invention.

Each fin 26 has a vertical portion 28 and a slanted portion 30. Slanted portions 30 extend from the bottoms 32 of vertical portions 28 downwardly toward the center of baking pan 12. The lower ends 34 of slanted portions 30 of fins 26a and 26b are located about the center of baking pan 12 and are contiguous. All fins 26 have a slanted portion 30 which extends under an adjacent vertical portion 28, excepting fins 26a and 26b. With this structure, a line-of-sight from directly over capture shield 8 to baking pan is blocked (FIG. 3). Alternate capture shield designs are shown in FIGS. 4, 5, and 6. Each design shares the characteristic that a direct vertical path out of baking pan 12 is blocked. FIG. 4 is the design depicted in FIGS. 1-3. Each fin 26 has a vertical portion 28 and slanted portion 30. FIG. 5 is the Bernoulli rod arrangement, with transverse rod 36 having obstructing rods 38 and 40 positioned above and below, respectively. Bottom obstructing rods 38 are spaced apart and extend completely across baking pan 12, with top obstructing rods 40 positioned over the spaces between rods 38. With this arrangement, vertical tangential lines on either side of a top obstructing rod 40 intersect the circumference of a bottom obstructing rod 38. Thus no vertical line-of-sight can extend through capture grill 8'.

FIG. 6 is a V-configuration arrangement, with fins 42 having the shape of a horizontal V. Each fin 42 has a vertex 44, an upwardly slanted portion 46, and a downwardly slanted portion 48. Slanted portions 46 and 48 extend in a horizontal direction toward the center of the baking pan, with each pair of slanted portions 46 and 48 having the vertex 44 of its adjacent fin 42 located within the boundaries of the triangle defined by portions 46 and 48. In the center, middle fins 42a and 42b have a similar contour but are smaller than the other fins 42, and rod 50 is positioned between middle fins 42a and 42b for blocking the direct line-of-sight.

If desired, the grill rack 10 could be omitted and the capture shield 8 could be clamped to pan 12 in order to compress the food product and impart the grill markings on the top of the food product. The fins 26 of shield 8 will be heated by the impinging air and this, in combination with a sugar based glaze, will impart the appropriate grill markings on the food product.

In operation, grill rack 10 is pivoted to open access to the interior of baking pan 12 and food items such as pieces of chicken (not shown) are placed within baking pan 12. Next, grill rack 10 is pivoted over to cover baking pan 12, usually pressing down on the food items inside and latched in place. Once grill rack 10 is securely in position, capture shield 8 is positioned over grill rack 10, with end aprons 22 mating with respective end loops 24. The resulting assembly is placed within an impingement oven, which may be either a moving conveyor surface or a stationary surface.

Once in the impingement oven, jets of hot air are directed into baking pan 12, heating the chicken then recirculating. As the chicken is heated, fat and grease are vaporized and enter the air flow. However, as the air recirculates and leaves baking pan 12, the flow collides with the surfaces of fins 26. The collisions divert the air in the flow, but the heavier suspended fat and grease particles tend to deposit and accumulate on the surfaces of fins 26. Although some fat or grease may avoid fins 26, a great majority of the vaporized fat and grease form droplets. After a period of time, the droplets created by the accumulation start to flow downwardly on the surfaces of fins 26 and drip back onto the chicken, thus basting the chicken with its own drippings. For fat and grease that does not vaporize, the depressions on surface 13 of baking pan 12 provide grease wells which collect the grease between ribs 13a and beneath the chicken.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and which fall within the limits of the appended claims.

What is claimed is:

1. A splatter capture shield for a baking pan adapted for use in an impingement oven, said capture shield comprising:

a plurality of elongate shield elements, reach said shield element including a vertically straight air flow receiving portion adapted for receiving heated, columnated jets of air, said shield elements also having slanted portions arranged to be vertically overlapping whereby vaporized particles flowing upward through said capture shield tend to deposit on one of said shield elements, and said shield elements being spaced apart to allow air to flow through substantially all of said capture shield.

2. A splatter capture shield for positioning on the top of a baking pan adapted for use in an impingement oven which vertically directs heated, columnated jets of air onto the top of the baking pan, said capture shield comprising:

a pair of side walls;

a pair of end aprons connected between said side walls, said end aprons adapted to fit over the baking pan; and a plurality of elongate shield elements, said shield elements having two ends attached to respective side walls, said shield elements arranged between said end aprons, said shield elements having a vertically straight portion arranged to receive the heated, columnated jets of air, said shield elements also having a slanted portion arranged to be vertically overlapping to obstruct a direct line-of-sight from directly over said capture shield to the baking pan, and said shield elements spaced apart to allow air to flow through substantially all of said capture shield.

3. The impingement oven and baking pan combination comprising:

an enclosure defining a cooking chamber;

a food support member disposed within said cooking chamber;

a heat duct disposed adjacent said food support member, said heat duct adapted for directing a flow of heated air against a food product, said heat duct including a plurality of nozzles positioned to direct a plurality of columnated air jets toward said food support member;

means for supplying heated air to said heat ducts;

a baking pan for supporting the food product, said baking pan having an open to for allowing said columnated heated air jets to flow over and around the food product; and a capture shield on said baking pan and including a plurality of elongated shield elements, said shield elements having vertically straight portions for receiving said columnated heated air jets, said shield elements arranged to be vertically overlapping to obstruct a direct line-of-sight from directly over said capture shield to said baking pan, and said shield elements spaced apart to allow said heated columnated air jets to flow through substantially all of said capture shield.

* * * * *

UNITED STATES PATENT AND TRADEMARK OFFICE
CERTIFICATE OF CORRECTION

PATENT NO.  :  5,012,071
DATED       :  April 30, 1991
INVENTOR(S) :  Mitchell C. Henke It is certified that error appears in the above-identified patent and that said Letters Patent is hereby corrected as shown below:

Column 4, claim 1, line 19, delete "reach" and substitute therefor --each--.

Column 4, claim 3, line 64, delete "to" and substitute therefor --top--.

Signed and Sealed this

Seventeenth Day of November, 1992

Attest:

DOUGLAS B. COMER

Attesting Officer     Acting Commissioner of Patents and Trademarks